(12) United States Patent
Padmanaban P C et al.

(10) Patent No.: US 11,762,755 B2
(45) Date of Patent: Sep. 19, 2023

(54) SYSTEMS AND METHODS FOR NON-HUMAN ACCOUNT TRACKING

(71) Applicant: JPMORGAN CHASE BANK, N.A., New York, NY (US)

(72) Inventors: Harish Padmanaban P C, Vadavalli (IN); Ashfaq Mohammed, Attapur (IN); Nazim Abdul Rahim, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/657,473

(22) Filed: Mar. 31, 2022

(65) Prior Publication Data

US 2023/0244589 A1   Aug. 3, 2023

(30) Foreign Application Priority Data

Jan. 28, 2022   (IN) .............................. 202211004668

(51) Int. Cl.
| | | |
|---|---|---|
| *G06F 11/34* | (2006.01) | |
| *G06F 21/30* | (2013.01) | |
| *G06F 16/28* | (2019.01) | |

(52) U.S. Cl.
CPC ........ *G06F 11/3476* (2013.01); *G06F 16/284* (2019.01); *G06F 21/305* (2013.01); *G06F 2221/2131* (2013.01)

(58) Field of Classification Search
CPC ..... H04L 43/10; H04L 43/0876; H04L 63/20; G06Q 10/067; G06Q 30/02
See application file for complete search history.

(56) References Cited

U.S. PATENT DOCUMENTS

| | | | | |
|---|---|---|---|---|
| 2008/0189254 | A1* | 8/2008 | Cancel ................... | G06Q 30/02 |
| 2013/0198376 | A1* | 8/2013 | Landa ................. | H04L 43/0876 709/224 |
| 2014/0122703 | A1* | 5/2014 | Pugh ................... | H04L 43/0876 709/224 |
| 2016/0070832 | A1* | 3/2016 | Boahene .............. | G06Q 10/067 703/13 |
| 2018/0337941 | A1* | 11/2018 | Kraning ................... | H04L 43/10 |
| 2023/0090190 | A1* | 3/2023 | Iila .......................... | H04L 63/20 |

\* cited by examiner

*Primary Examiner* — Barbara B Anyan
(74) *Attorney, Agent, or Firm* — GREENBERG TRAURIG LLP

(57) ABSTRACT

Systems and methods for non-human account tracking are disclosed. According to one embodiment, a method may include: retrieving, by a tracing tool computer program executed by a computer processor, a plurality of records for a computer application from an application database, the plurality of records comprising a computer application name, one or more Application Programming Interfaces (APIs) associated with the computer application, and an identification of a plurality of non-human accounts that have access to the computer application; storing, by the tracing tool computer program, the plurality of records as raw data in a relational database; determining, by the tracing tool computer program, that each of the retrieved plurality of non-human accounts is in an account vault; associating, by the tracing tool computer program, the non-human accounts with the retrieved one or more APIs; and storing, by the tracing tool computer program, the association in a relational database.

8 Claims, 4 Drawing Sheets

SYSTEMS AND METHODS FOR NON-HUMAN ACCOUNT TRACKING

RELATED APPLICATIONS

This application claims priority to Indian Patent Application Number 202211004668 filed Jan. 28, 2022, the disclosure of which is hereby incorporated, by reference, in its entirety.

BACKGROUND OF THE INVENTION

1. Field of the Invention

Embodiments relate generally to systems and methods for non-human account tracking.

2. Description of the Related Art

Computer programs and applications may have their own accounts. These accounts are used by the applications to perform automated actions for users. Because these accounts are often unsupervised, or have little supervision, management of these accounts is problematic.

SUMMARY OF THE INVENTION

Systems and methods for non-human account tracking are disclosed. According to one embodiment, a method for non-human account tracking may include: (1) retrieving, by a tracing tool computer program executed by a computer processor, a plurality of records for a computer application from an application database, the plurality of records comprising a computer application name, one or more Application Programming Interfaces (APIs) associated with the computer application, and an identification of a plurality of non-human accounts that have access to the computer application; (2) storing, by the tracing tool computer program, the plurality of records as raw data in a relational database; (3) determining, by the tracing tool computer program, that each of the retrieved plurality of non-human accounts is in an account vault; (4) associating, by the tracing tool computer program, the non-human accounts with the retrieved one or more APIs; and (5) storing, by the tracing tool computer program, the association in a relational database.

In one embodiment, the tracing tool computer program may also receive one or more tools associated with the computer application and associates the retrieved one or more tools with the non-human accounts.

In one embodiment, the tracing tool computer program may retrieve the records using a Phyton wrapper.

In one embodiment, the tracing tool computer program may access the account vault using one of the plurality of APIs.

In one embodiment, the account vault may include a password for at least one of the non-human accounts.

In one embodiment, the method may also include generating, by the tracing tool computer program, a notification for each of the non-human accounts that is not in the account vault.

In one embodiment, the plurality of records may also include entitlements data for the non-human account. The method may further include verifying, by the tracing tool computer program and using the entitlements data, that the non-human account is entitled to access one or more service.

According to another embodiment, a method for monitoring non-human account information may include: (1) receiving, by a tracing tool computer program executed by a computer processor, a request to monitor a non-human account; (2) retrieving, by the tracing tool computer program, one or more Application Programming Interfaces (APIs) and/or one or more tools associated with the computer application from a database; (3) attempting to authenticate, by the tracing tool computer program, to each of the one or more APIs and/or one or more tools; and (4) publishing, by the tracing tool computer program, a result of the attempt.

In one embodiment, the database may be a relational database.

In one embodiment, the result may include a status of the authentication attempt.

In one embodiment, the result may include an identification of a corrective action being taken.

In one embodiment, the request to monitor may be received during application onboarding.

According to another embodiment, a method for non-human account recovery may include: (1) receiving, by a tracing tool computer program executed by a computer processor, a request to auto-recover a non-human account; (2) determining, by the tracing tool computer program, that access to the non-human account is revoked or locked; (3) retrieving, by the tracing tool computer program, a password for the account from an account vault; (4) determining, by the tracing tool computer program, that the password has expired; (5) retrieving, by the tracing tool computer program, password expiry information for the password from the account vault; (6) resetting, by the tracing tool computer program, the password with a new password; and (7) sending, by the tracing tool computer program, an alert to an interested party.

In one embodiment, the request to auto-recover a non-human account may be received in response to an issue with the account.

In one embodiment, the method may also include replacing, by the tracing tool computer program, the password in the account vault with the new password.

In one embodiment, the step of resetting the password may include: generating, by the tracing tool computer program, a new access token; generating, by the tracing tool computer program, the new password for the new access token; and replacing, by the tracing tool computer program, the password in the account vault with the new password.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally directed to systems and methods for non-human account tracking.

Embodiments may identify and provide the status of any non-human accounts used by an application by extracting information for such accounts from repositories and server files associated with a project identifier, and mapping those non-human accounts to tools and APIs that may be used with the non-human accounts. In one embodiment, an Active Directory LDAP Application Programming Interface (API) may be used to provide a holistic view of the non-human accounts.

Embodiments may facilitate tracking a non-human account ID owned by a specific application module. Embodiments may manage non-human account ownership and may fix or resolve any issues relevant to a non-human account ID in using the mapping.

Embodiments may provide information regarding the non-human account ID, such as whether the account is secure, when there are issues with the non-human account being expired, locked, etc. Embodiments may facilitate automated recovery of the non-human account ID and the sending of alerts based on user instructions.

Figure 1:
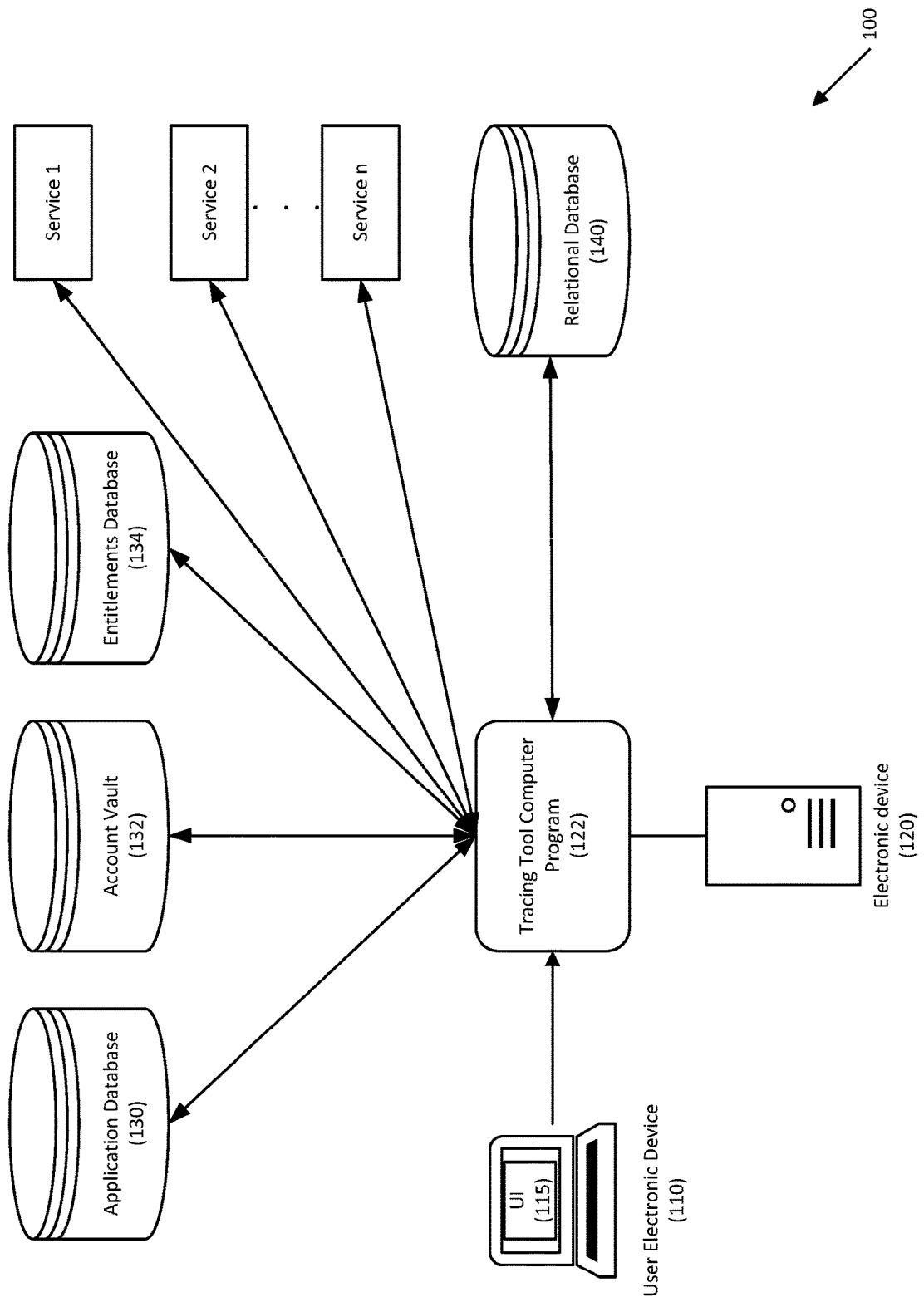
FIG. 1 depicts a system for non-human account tracking according to an embodiment.

Referring to FIG. 1, a system for non-human account tracking is provided according to an embodiment. System 100 may include user electronic device 110, which may be any suitable electronic device that may provide app-based or browser-based user interface 115. Examples include computers (e.g., workstations, desktops, notebooks, tablets, etc.), smart devices (e.g., smart phones, etc.), Internet of Things (IoT) appliances, etc.

User interface 115 may interface with tracing tool computer program 122, which may be executed by electronic device 120. Electronic device 120 may be any suitable electronic device, including servers (e.g., physical and/or cloud-based), computers, etc.

Tracing tool computer program 122 may interface with one or more database, such as application database 130, account vault 132, and entitlements database 134. Application database 130 may maintain a roster of applications used by an organization, accounts that may access the applications, APIs and tools used by the application, etc. Account vault 132 may maintain a list of non-human accounts and passwords used by those non-human accounts.

In one embodiment, each account may have an access token, and the access token may be associated with a password.

Relational database 140 may store records retrieved from application database 130, such as the application name, APIs, tools, services, etc.

Tracing tool computer program 122 may also retrieve entitlements data for records retrieved from application database 130 from entitlements database 134. Entitlements database 134 may maintain entitlements or permissions for the non-human accounts to access applications, APIs, services, etc. Tracing tool computer program 122 may verify that the non-human account is entitled to access the data, services, etc. requested.

Figure 2:
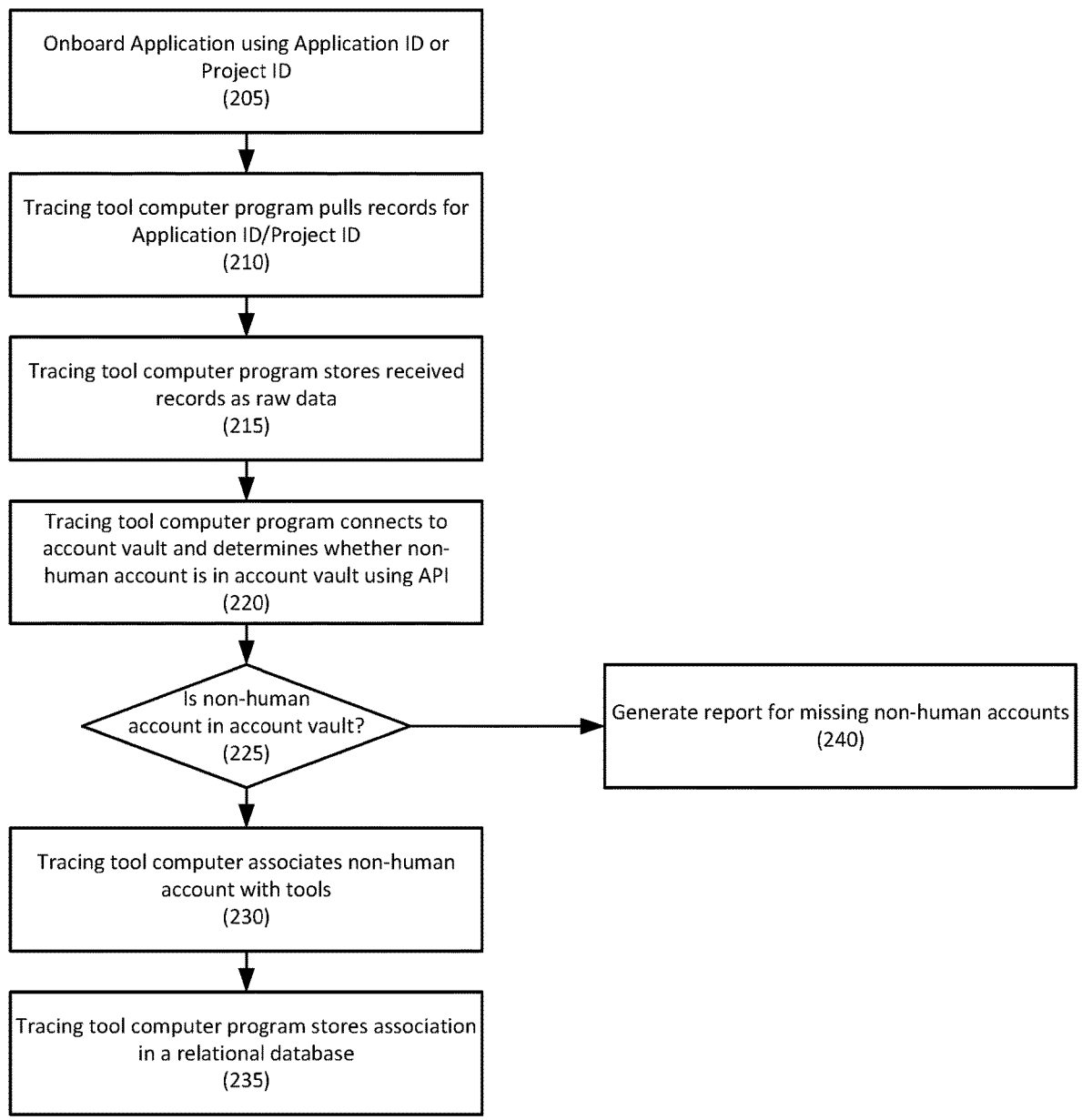
FIG. 2 depicts a method for non-human account tracking according to an embodiment.

Referring to FIG. 2, a method for non-human account tracking is provided according to an embodiment.

In step 205, an application may be onboarded to an application database using, for example, the application's application identifier or a project identifier for the application.

In step 210, a tracing tool computer program may retrieve records for the application, such as the application name, APIs, tools, and/or services associated with the application, non-human accounts that access the application, etc. and, in step 215, may store those records as raw data in, for example, a relational database.

In one embodiment, the tracing tool computer program may use a wrapper (e.g., a Phyton wrapper or similar) to retrieve the records.

In step 220, for each non-human account identified, the tracing tool computer program may connect to an account vault and may determine whether the non-human account is in account vault using, for example, an API. In one embodiment, the account vault may store non-human account identifiers, names, etc.

In step 225, if the non-human account is in the account vault, in step 230, the tracing tool computer program may associate the non-human account with the APIs, tools, and/or services used by the application. In step 235, the tracing tool computer program may store the association between the non-human account and the APIs, tools, and/or services in, for example, a relational database.

In step 225, if the non-human account is not in the account vault, in step 240, a report or notification may be generated.

Figure 3:
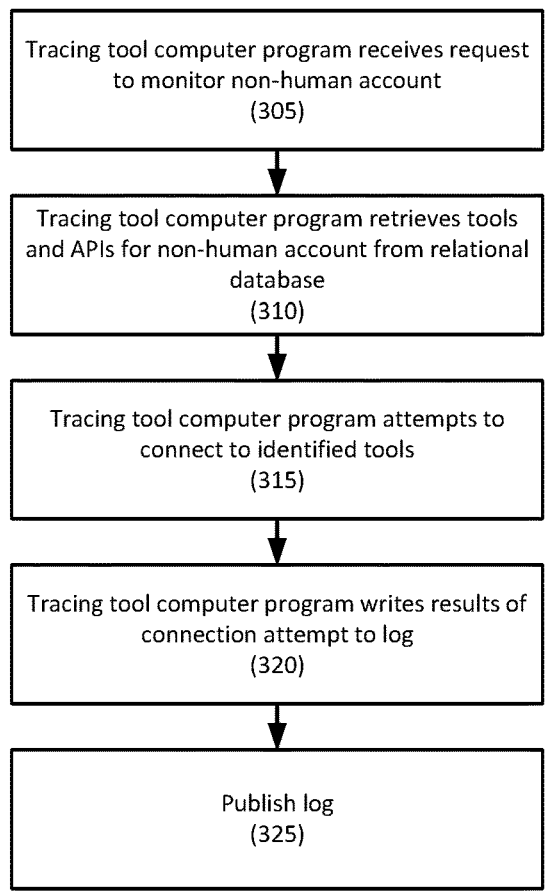
FIG. 3 depicts a method for monitoring non-human account information according to an embodiment.

Referring to FIG. 3, a method for monitoring non-human account information is provided according to an embodiment.

In step 305, a tracing tool computer program may receive a request to monitor a non-human account by, for example, non-human account name or other suitable identifier. The request may be made, for example, during application onboarding.

In step 310, the tracing tool computer program may retrieve associated APIs, tools, and/or services for the non-human account from, for example, a relational database such as that described above.

In step 315, the tracing tool computer program may attempt to connect to the identified APIs, tools, and/or services. In one embodiment, the tracing tool computer program may use account credentials retrieved from the account vault for the non-human account. For example, the tracing tool computer program may attempt to authenticate to the APIs, tools, and/or services, log in to the APIs, tools, and/or services, etc.

In step 320, the tracing tool computer program may write the results of the connection attempt, and in step 325, may publish or otherwise make the results available in, for example, a log. The log may indicate if the non-human account is active, whether there is an issue with the non-human account, any action(s) being taken to resolve the issue, an estimated time for correction, and may provide a link to details. The details may provide detailed reasons for failure, actions taken, etc. Examples of actions taken may include resetting the password, recovering the account, etc.

Figure 4:
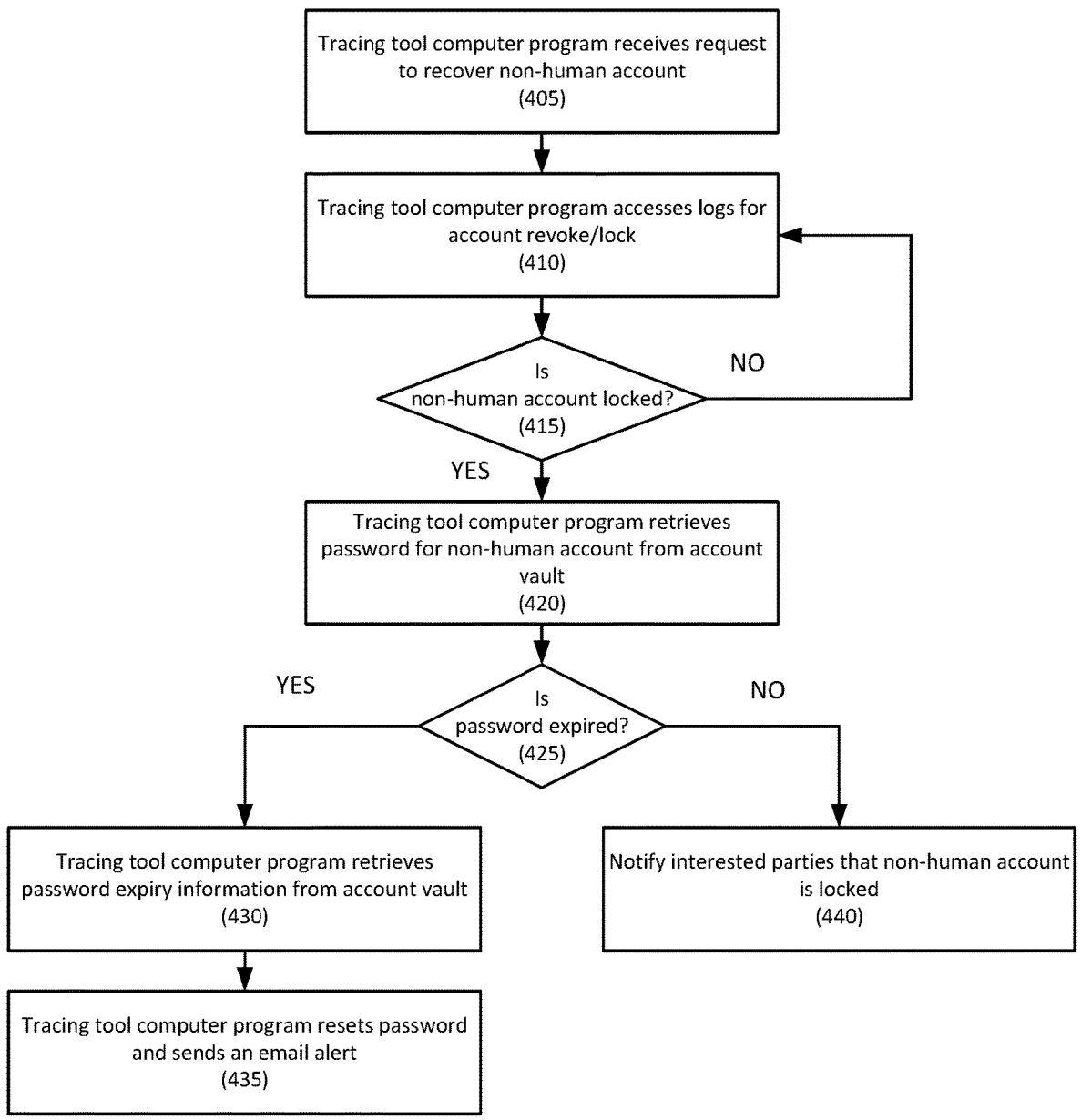
FIG. 4 depicts a method for non-human account recovery according an embodiment.

Referring to FIG. 4, a method for non-human account recovery is provided according to an embodiment. In step 405, a tracing tool computer program may receive a request to recover a non-human account. For example, the recovery request may be an auto-recover request that may be triggered whenever the monitoring process identifies an issue with the non-human account.

In step 410, the tracing tool computer program may access logs for the non-human account, such as whether the monitoring process has identified that access to the non-human account has been revoked or locked.

In step 415, if the access to the non-human account is revoked or locked, in step 420 the tracing tool computer program may retrieve a password for the non-human account from, for example, the account vault.

In step 425, the tracing tool computer program may determine whether or not the password has expired. If the password has expired, in step 430, the tracing tool computer program may retrieve password expiry information from the account vault and, in step 435, may reset the password or set a new password for the non-human account. For example, the tracing tool computer program may replace the expired password in the account vault with the new password. It may then send an email alert to any interested parties.

In another embodiment, the tracing tool computer program may create a new access token for the account and may set a new password for the access token. It may then store the password in the account vault.

If the password has not expired, in step 440, the tracing tool computer program may notify any interested parties that the non-human account is locked. The tracing tool computer program may attempt to unlock the non-human account by, for example, updating the password, requesting an unlock from an administrator, etc.

In one embodiment, the reason for the non-human being locked may be provided, such as a number of unsuccessful login attempts to the non-human account that exceeds a threshold, suspected fraudulent activity involving the non-human account, etc.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for non-human account tracking, comprising:
retrieving, by a tracing tool computer program executed by a computer processor, a plurality of records for a computer application from an application database, the plurality of records comprising a computer application name, one or more Application Programming Interfaces (APIs) associated with the computer application, and an identification of a plurality of non-human accounts that have access to the computer application;
storing, by the tracing tool computer program, the plurality of records as raw data in a relational database;
determining, by the tracing tool computer program, that each of the retrieved plurality of non-human accounts is in an account vault;
associating, by the tracing tool computer program, the non-human accounts with the retrieved one or more APIs; and
storing, by the tracing tool computer program, the association in a relational database.

2. The method of claim 1, wherein the tracing tool computer program further receives one or more tools associated with the computer application and associates the retrieved one or more tools with the non-human accounts.

3. The method of claim 1, wherein the tracing tool computer program retrieves the records using a Phyton wrapper.

4. The method of claim 1, wherein the tracing tool computer program accesses the account vault using one of the plurality of APIs.

5. The method of claim 1, wherein the account vault comprises a password for at least one of the non-human accounts.

6. The method of claim 1, further comprising:
generating, by the tracing tool computer program, a notification for each of the non-human accounts that is not in the account vault.

7. The method of claim 1, wherein the plurality of records further comprise entitlements data for the non-human account.

8. The method of claim 7, further comprising:
verifying, by the tracing tool computer program and using the entitlements data, that the non-human account is entitled to access one or more service.

* * * * *